Dec. 13, 1955 L. S. PERGANDE 2,726,456
GEAR CHECKING APPARATUS
Filed Jan. 11, 1955 3 Sheets-Sheet 1

INVENTOR.
Leslie S. Pergande
BY Olson & Trexler
Atty's.

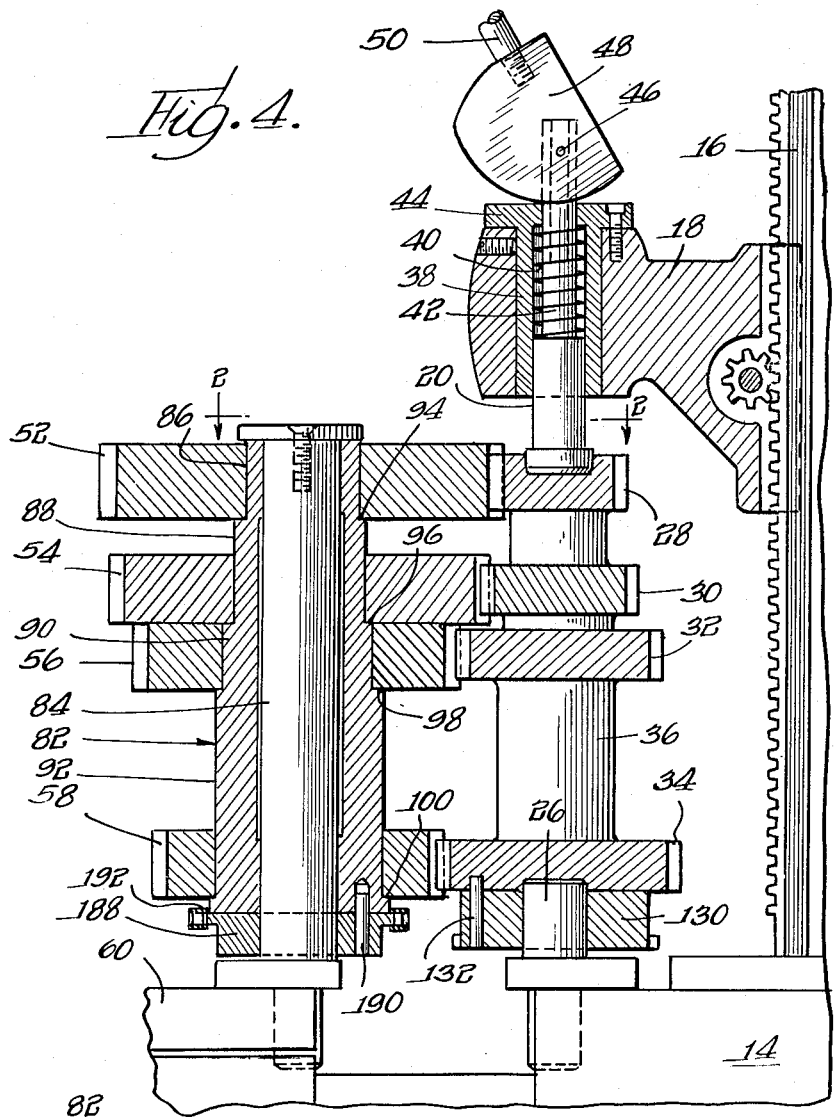
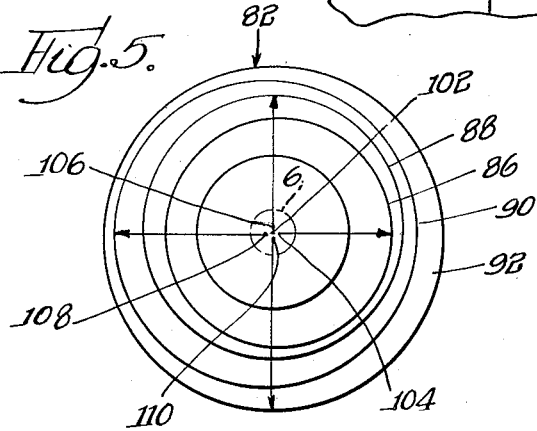
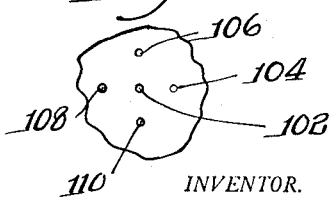

Dec. 13, 1955  L. S. PERGANDE  2,726,456
GEAR CHECKING APPARATUS
Filed Jan. 11, 1955  3 Sheets-Sheet 3
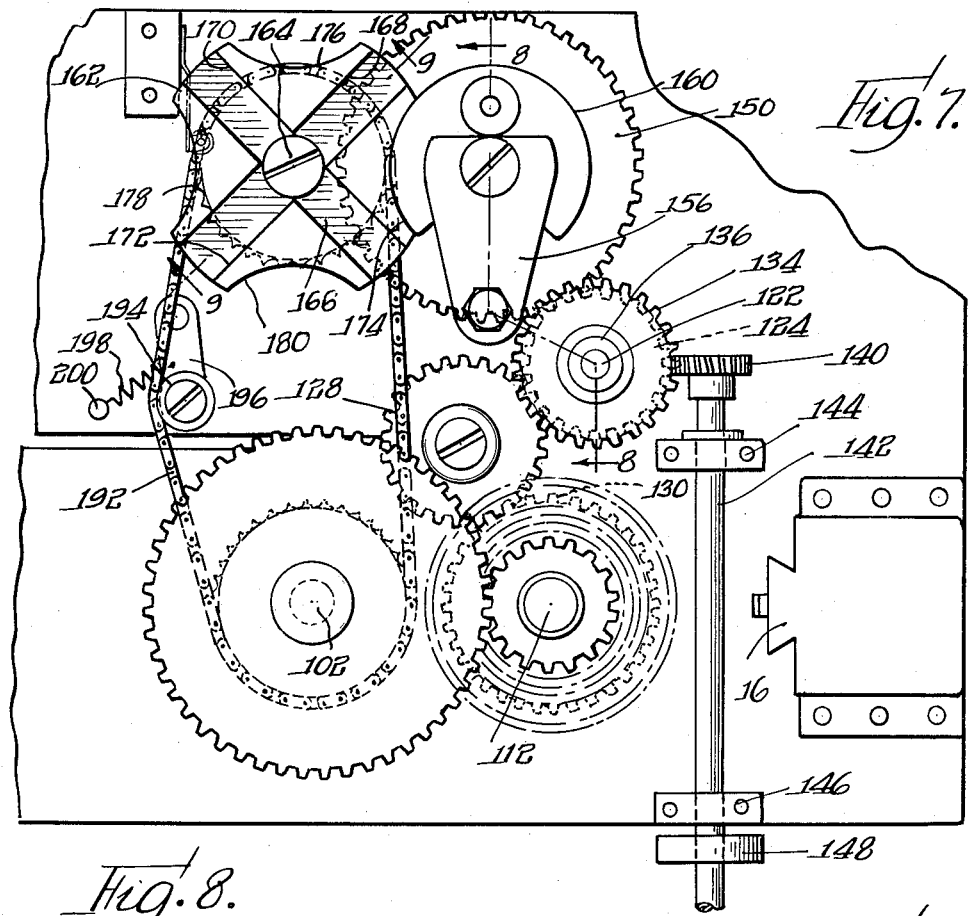
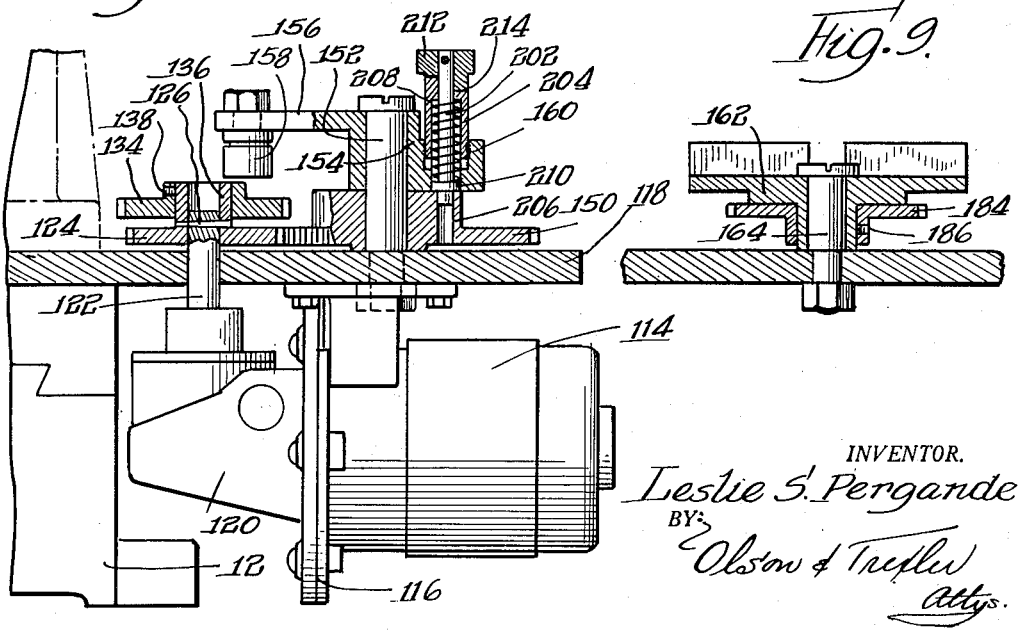
INVENTOR.
Leslie S. Pergande
BY:
Olson & Trexler
Attys.

United States Patent Office 2,726,456
Patented Dec. 13, 1955

2,726,456
GEAR CHECKING APPARATUS

Leslie S. Pergande, Mount Prospect, Ill., assignor to Illinois Tool Works, Chicago, Ill., a corporation of Illinois Application January 11, 1955, Serial No. 481,051

11 Claims. (Cl. 33—179.5)

The present invention relates to a novel apparatus for checking gears and like workpieces and more particularly, to a novel gear checking apparatus of the type wherein a master gear is rolled with the workpiece to be checked.

When checking gears with heretofore known apparatus of the general type contemplated herein, the gears are usually mounted one at a time on the apparatus, then checked and then removed and replaced by the next gear to be checked. It will be appreciated that the time required for setting up the checking apparatus for each individual gear to be checked forms an important part of the total time required for the checking operation. In order to reduce the time required and, therefore, the labor cost involved in checking a plurality of gears, it is an important object of the present invention to provide a novel apparatus on which a plurality of gears may be mounted at one time and then individually checked in a rapid and economical manner.

Another object of the present invention is to provide a novel apparatus of the above described type which is capable of individually checking a plurality of concentrically mounted gear-like workpieces having the same or different diameters.

A more specific object of the present invention is to provide a novel apparatus which is particularly suitable for individually checking gears of a cluster gear assembly by successively rolling master gears with the work gears.

Another more specific object of the present invention is to provide a novel apparatus of the above described type which is constructed so as to be capable of successively shifting a plurality of master gears into and out of checking engagement with a plurality of workpiece gears.

Other objects and advantages of the present invention will become apparent from the following description and the accompanying drawings wherein:

Fig. 4 is an enlarged fragmentary sectional view taken along line 4—4 in Fig. 1;

Fig. 5 is a plan view of the novel master gear supporting mandrel of this invention;

Fig. 6 is an enlargement of that portion of Fig. 5 enclosed by the broken line circle indicated by the numeral 6 in Fig. 5;

Fig. 7 is a fragmentary plan view of the apparatus of this invention with the work mounting headstock removed;

Fig. 8 is a sectional view taken along line 8—8 in Fig. 7; and

Fig. 9 is a fragmentary sectional view taken along line 9—9 in Fig. 7.

Figure 1:
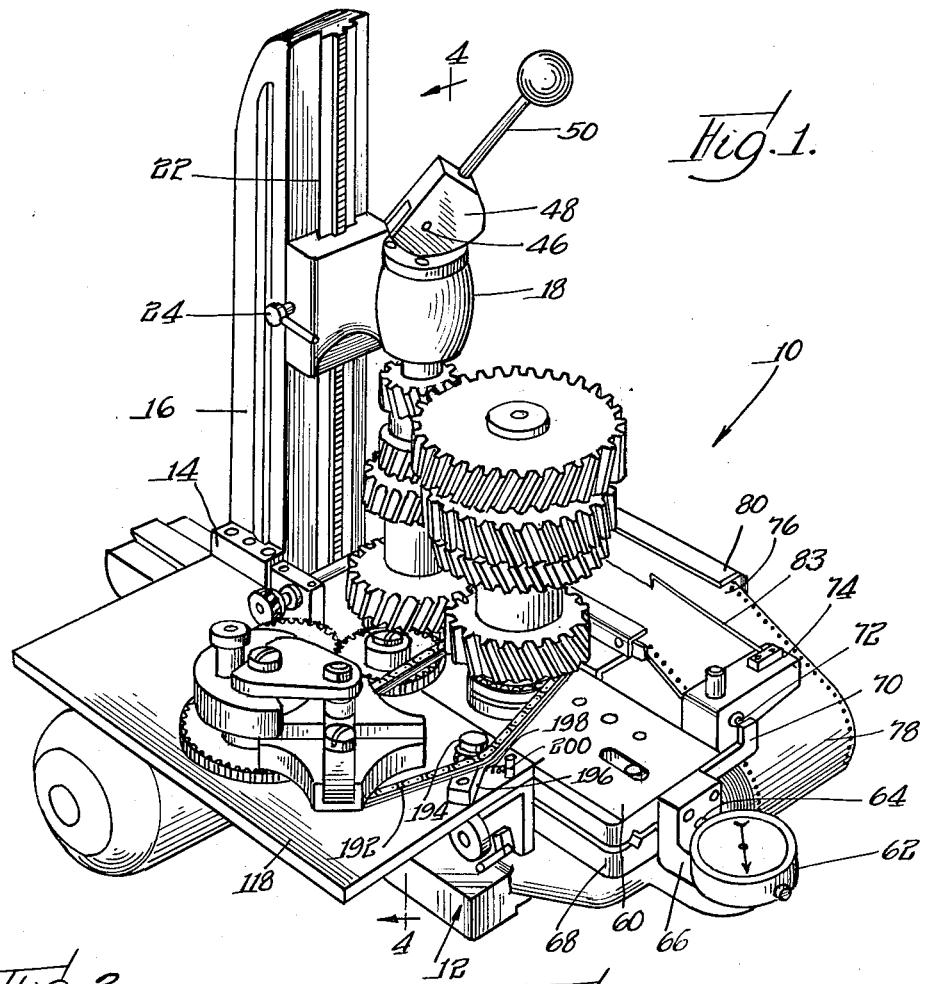
Fig. 1 is a perspective view showing an apparatus embodying the principles of this invention.
Figure 2:
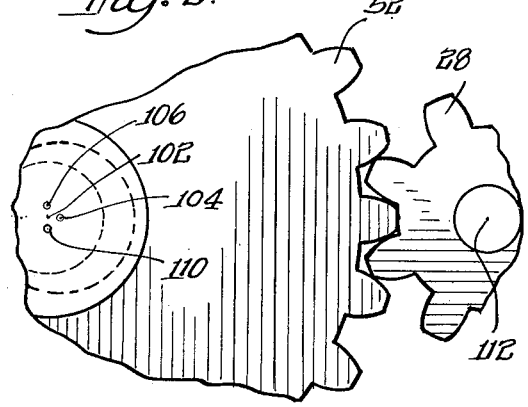
Fig. 2 is an enlarged fragmentary sectional view taken along line 2—2 in Fig. 4 and showing one workpiece gear and its master gear in checking engagement.

Referring now more specifically to the drawings wherein like parts are designated by the same numerals throughout the various figures, an apparatus 10 embodying the features of the present invention includes a base 12 which is adapted to be mounted on a table or any other suitable support. A carriage block 14 is adjustably mounted on the base and carries a standard 16. A headstock 18 carrying a center 20 is slidably mounted on a dovetail guideway 22 on the standard and may be locked in any desired adjusted position by a set screw 24. The center 20 cooperates with a center 26 on the carriage block 14 for rotatably mounting a gear or workpiece supporting mandrel.

For the purpose of illustrating an application of the principles of this invention to a particular checking operation, a plurality of workpiece gears 28, 30, 32 and 34 are shown mounted on or made integral with a shaft 36 to provide a cluster gear assembly. However, it should be understood that the apparatus of this invention may also be used for checking a plurality of gears which are removably mounted on a mandrel for checking purposes. In order to facilitate rapid mounting and dismounting of the workpiece, the center 20 is slidably mounted in the headstock and means is provided whereby the center 20 may be quickly raised and lowered to and from workpiece engaging and workpiece releasing positions. More specifically, the center 20 is slidably mounted within a tubular insert 38 fixed in an aperture in the headstock and a compression spring 40 is provided for resiliently biasing the center to the workpiece engaging position. The center is connected with or made integral with a rod 42 which extends through an aperture in the end plate 44 of the insert and is pivotally connected by means of a pin 46 with a cam member 48. An operating handle 50 is also connected to the cam member. As shown best in Fig. 4, the cam member 48 is formed so that when the operating handle is pushed downwardly the cam is rotated about the connecting pin 46 and lifts the center 20 against the action of the spring.

In order to check the workpiece gears 28 through 34, master gears 52, 54, 56 and 58 are provided. In accordance with an important feature of the present invention, means which will be described below is provided for successively moving the master gears into and out of checking engagement with their associated workpiece gears, and as shown in Fig. 1, the master gears are carried by a slide block 60. The slide block 60 is resiliently urged by known means, not shown, toward the workpiece assembly. A dial indicator 62 of any known construction having a spring biased actuating plunger 64 is mounted on the slide block 60 by means of a bracket 66 with the plunger extending through an aperture in the bracket and engaging a fixed base plate 68. With this structure any inaccuracies in the workpiece gears cause the slide block 60 to shift back and forth as the master gears are successively rolled with the workpiece gears, and this back and forth movement is shown by the indicating dial. In addition, a bar 70 is fixed to the slide block and moved therewith, which bar actuates a plunger 72 of a marking pen actuating device 74 of any known construction. An elongated strip 76 of graph paper is fed from a roll 78 in the manner described below over a table structure 80 and beneath the marking pen 83 so that a permanent record may be made of the checking operation results.

Figure 3:
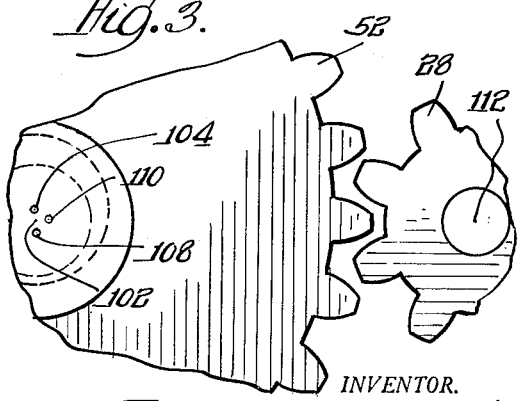
Fig. 3 is a fragmentary view similar to Fig. 2 but showing the master gear shifted out of checking engagement with the workpiece gear.

As mentioned above, means is provided for successively shifting the master gears into and out of engagement with their associated workpiece gears. This means includes a mandrel or sleeve generally designated by the numeral 82 on which the master gears are mounted and which, in turn, is rotatably supported by an upstanding post 84. The post 84 is mounted on the slide block 60. The sleeve 82 is provided with a number of eccentric cylindrical portions in accordance with the number of master gears to be mounted so that in the form of the invention shown, the sleeve 82 is provided with eccentric cylindrical portions 86, 88, 90 and 92. As shown best in Fig. 4, the master gear 52 is rotatably mounted on the sleeve portion 86 and is supported against downward movement by a shoulder 94 between the portions 86 and 88. The master gear 54 is rotatably mounted on the portion 88 and is supported by a shoulder 96. Similarly, the master gears 56 and 58 are respectively rotatably mounted on the portions 90 and 92 and are supported by shoulders 98 and 100. Better to describe the eccentricity of the various sleeve portions, reference is made to Figs. 5 and 6 wherein the point 102 represents the center of the post 84 and the bore in the sleeve 82. The points 104, 106, 108 and 110, respectively, represent the centers of the outer cylindrical surfaces of the portions 86 through 92, which centers are radially offset from the center 102 and are angularly spaced ninety degrees from each other. With the sleeve 82 in the position shown in Figs. 2, 4, 5 and 6, it is seen that the center 104 of the sleeve portion 86 is disposed closest to the center of the workpiece gear assembly whereby the master gear 52 is disposed in checking engagement with the gear 28 while the master gears 54, 56 and 58 are in various withdrawn positions out of checking engagement with their associated work gears. By indexing the sleeve ninety degrees to the position shown in Fig. 3, the master gear 52 is withdrawn from checking engagement with the workpiece gear 28. At the same time, the center 110 has been shifted to a position closest to the workpiece or into a plane extending through the center 102 of the sleeve and the center 112 of the work assembly so that the master gear 58 is shifted into checking engagement with the workpiece gear 34. Of course, each time the sleeve 82 is indexed ninety degrees, a different master gear will be shifted into checking engagement with one of the workpiece gears until the cycle has been completed.

In order to check all the workpiece gears automatically, means is provided for continuously rotating the workpiece gear assembly and for indexing the master gear mounting sleeve and for feeding the chart paper strip in timed relationship with the rotation of the work assembly. This means includes an electric motor 114 which is mounted by a bracket 116 to a supporting plate or platform 118 which, in turn, is mounted on the base 12. Suitable control means, not shown, is provided for energizing and de-energizing the motor. The motor is connected with a speed reducing unit 120 having an output shaft 122 extending up through an aperture in the plate 118. A gear 124 is fixed to the upper end of the shaft 122 by means of a pin 126 and meshes with an idler gear 128. The gear 128, in turn, meshes with a gear 130 rotatably mounted on the center 26 and interconnected with the workpiece assembly by means of a pin 132 as shown in Fig. 4. Thus, the workpiece assembly is continuously driven by the gears 124, 128 and 130. In order to feed the chart paper, a gear 134 is fixed on a hub portion 136 of the gear 124 by means of a set screw 138, and the gear 134 meshes with a gear 140 mounted on a shaft 142. The shaft is rotatably supported by a pair of bearing blocks 144 and 146 and, as partially shown in Fig. 7, extends laterally of the base 12 over the table structure 80. A pair of friction rollers 148, only one of which is shown, is fixed on the shaft 142 for engaging and feeding the chart paper strip over the table structure. Thus, it is seen that the chart paper strip will be fed in timed relationship with the rotation of the workpiece assembly.

The means for indexing the master gear supporting sleeve 82 includes a large gear 150 rotatable about a stub shaft 152 connected with the platform 118, which gear is driven by the gear 124. The gear 150 serves to drive a Geneva motion device which, in turn, is operatively connected with the sleeve 82 and serves to impart an intermittent indexing motion to the sleeve. The Geneva motion device includes a member 154 having an arm portion 156 carrying a roller 158 and an interrupted circular disk portion 160. A disk member 162 is rotatably mounted on the platform or plate 118 by a stub shaft 164 and is provided with slots 166, 168, 170 and 172 adapted to receive the roller 158 and peripheral recesses 174, 176, 178 and 180 adapted to cooperate with the disk portion 160 as will be understood. As shown in Fig. 9, a sprocket 184 is fixed to a hub portion of the disk 162 by a set screw 186. Another sprocket 188 is rotatably disposed on the post 84 and is rigidly interconnected with the sleeve 82 by a pin 190, and a chain 192 is wrapped around the sprockets 184 and 188. As will be understood, the disk member 162 will be intermittently rotated and locked by the member 154 of the Geneva motion device and a like intermittent motion will be imparted to the master gear supporting sleeve 82. In the particular embodiment shown in the drawings, the sprockets 184 and 188 and the Geneva motion device are constructed so that the sleeve 82 will be intermittently indexed through an angle of ninety degrees. In order to maintain the chain 192 under proper tension, an idler roller 194 on a pivotally mounted lever 196 is resiliently urged against the chain by means of a tension spring 198 extending between the lever and a pin 200 fixed to the platform 118.

In certain instances, it is desirable to drive the workpiece assembly without indexing the sleeve 82 in order to obtain repeated checks of the same workpiece gear and, therefore, means is provided for detachably interconnecting the gear 150 and the member 154 of the Geneva motion device. This means which is shown best in Fig. 8 includes a plunger 202 slidably disposed in a cylinder 204 connected with the disk portion 160 of the Geneva motion device member 154. The plunger is adapted to extend into an aperture 206 in the gear 150 and, thereby, interconnect the gear and the member 154. A compression spring 208 is provided and acts between a closed end of the cylinder and a flange 210 on the plunger for normally holding the plunger in engagement with the gear. In order to raise the plunger from the gear aperture and thereby disconnect the gear from the Geneva motion device, a knob 212 is secured to the upper end of the plunger and is provided with a helical cam surface 214 engageable with a similar cam surface on the cylinder so that by turning the knob from the position shown in Fig. 8, the knob and thus the plunger are raised.

A resume of the operation of the apparatus is as follows. The workpiece assembly to be checked is, of course, first mounted between the centers 20 and 26 and the slide block 60 carrying the master gears is adjusted to position one of the master gears in checking engagement with one of the workpiece gears. The means for adjusting the slide block is not shown but includes known means utilized in checking apparatus for shifting the block 68 which carries the slide block 60 to a predetermined position along the base 12. The dial indicator and the marking pen are then adjusted to a zero position and the motor is energized. If, for example, the master gear supporting sleeve 82 is in the position shown in Figs. 2, 4 and 5, the workpiece gear 28 and the master gear 52 are in checking engagement. As the workpiece assembly is rotated, the gear 28 rolls with or drives the master gear 52 and any inaccuracies in the workpiece gear cause the slide block 60 to shift in the manner described above to provide an indication of such inaccuracies. After the gear 28 has been checked, the master gear supporting sleeve 82 is indexed in the manner described above to bring another master gear into checking engagement with another workpiece gear and this action is repeated until all of the workpiece gears have been checked. It should be noted that the means for driving the workpiece assembly and for indexing the master gear supporting sleeve is preferably formed so that each of the workpiece gears will be completely checked, or in other words, will rotate one complete revolution before the sleeve is indexed.

From the above description, it is seen that the present invention has provided a novel apparatus whereby a plurality of concentrically mounted workpiece gears may be successively checked in a rapid and, therefore, economical manner. More specifically, it is seen that the present invention has provided a novel apparatus whereby a plurality of workpiece gears and a plurality of master gears may be mounted at one time in the apparatus and successively shifted into and out of checking engagement in an automatic manner so that each of the gears is individually checked.

While the preferred embodiments of the present invention have been shown and described herein, it is obvious that many structural details may be changed without departing from the spirit and scope of the appended claims.

The invention is claimed as follows:

1. An apparatus for checking workpieces such as gears and the like comprising means for simultaneously rotatably supporting a plurality of generally aligned workpieces, means for simultaneously supporting a plurality of master elements for endless motion in association with said workpieces, means mounting said supporting means for relative movement toward and away from each other in accordance with the inaccuracies found in said workpieces, and means for successively relatively shifting associated workpieces and master elements into and out of checking engagement.

2. An apparatus for checking workpieces such as gears and the like comprising means for simultaneously rotatably supporting a plurality of generally aligned workpiece gears, means for simultaneously rotatably supporting a plurality of generally aligned master gears each in association with one of said workpiece gears, and means for successively relatively shifting associated master and workpiece gears into and out of checking engagement.

3. An apparatus for checking workpieces such as gears and the like comprising means for simultaneously rotatably supporting a plurality of generally aligned workpiece gears, certain of said workpiece gears having different diameters than other workpiece gears, means for simultaneously rotatably supporting a plurality of generally aligned master gears having different diameters with each of the master gears in association with one of said workpiece gears, and means for successively relatively shifting associated master and workpiece gears into and out of checking engagement.

4. An apparatus for checking workpieces such as gears and the like comprising means for simultaneously rotatably supporting a group of generally aligned workpiece gears, means for simultaneously rotatably supporting a group of master gears each in association with one of said workpiece gears, said supporting means for one of said groups of gears including means for eccentrically positioning the gears in said one group with their centers angularly displaced from each other, and means for indexing said supporting means relative to each other for successively moving the associated master and workpiece gears into and out of checking engagement.

5. An apparatus for checking workpieces such as gears and the like comprising means for simultaneously rotatably supporting a plurality of generally aligned workpiece gears, and means for simultaneously rotatably supporting a plurality of generally aligned master gears each in association with one of said workpiece gears, one of said supporting means including a plurality of eccentric portions each for supporting one of said gears, said eccentric portions having their centers angularly displaced from each other so that by indexing said portions in unison relative to the other of said supporting means associated workpiece gears and master gears are successively moved into and out of checking engagement.

6. In an apparatus for successively checking a group of workpiece gears with a group of master gears each associated with one of the workpiece gears, means for rotatably supporting one of said groups of gears, said supporting means including a plurality of eccentric portions having centers angularly displaced from each other and each providing a rotatable support for a gear in said one group so that upon rotatably indexing said portions, associated master and workpiece gears are successively shifted into and out of checking engagement.

7. In an apparatus for successively checking a group of workpiece gears with a group of master gears each associated with one of said workpiece gears, means for rotatably supporting one of said groups of gears, said supporting means including a mandrel adapted to be rotatably mounted and comprising a plurality of ecentric portions having centers angularly displaced from each other, each of said portions providing a rotatable support for a gear in said one group, rotatable indexing of said mandrel causing associated master and workpiece gears to be successively shifted into and out of checking engagement.

8. An apparatus for checking workpieces such as gears and the like comprising means for simultaneously rotatably supporting a plurality of generally aligned workpiece gears, means for simultaneously rotatably supporting a plurality of generally aligned master gears each in association with one of said workpiece gears, means mounting said supporting means for relative movement toward and away from each other in accordance with any inaccuracies found in said workpiece gears, and means for successively relatively shifting associated workpiece and master gears into and out of checking engagement.

9. An apparatus for checking workpieces such as gears and the like comprising means for simultaneously rotatably supporting a group of workpiece gears, means for rotatably supporting a group of master gears each in association with one of said workpiece gears, one of said supporting means including a plurality of excentric gear supporting portions having their centers angularly displaced from each other, means for rotating said gears, and means for intermittently indexing said support means portions for successively moving associated master and workpiece gears into and out of checking engagement.

10. An apparatus for checking workpieces such as gears and the like comprising means for rotatably supporting a group of workpiece gears, means for rotatably supporting a group of master gears each in association with one of said workpiece gears, means mounting said supporting means for movement toward and away from each other in accordance with any inaccuracies found in said workpiece gears, one of said supporting means including a plurality of eccentric gear supporting portions having their centers angularly displaced from each other, means for rotating said groups of gears, means for intermittently indexing said support means portions for successively moving associated master and workpiece gears into and out of checking engagement, and means responsive to any relative movement of said supporting means toward and away from each other for providing an indication of any inaccuracies in the workpiece gears.

11. An apparatus for checking workpieces such as gears and the like comprising means for rotatably supporting a group of workpiece gears, means for rotatably supporting a group of master gears each in association with one of said workpiece gears, means mounting said supporting means for relative movement toward and away from each other in accordance with any inaccuracies found in said workpiece gears, means including a marking instrument operable upon a strip of sheet material and responsive to any relative movement of said supporting means toward and away from each other to provide an indication of any inaccuracies found in the workpiece gears, means for feeding said strip of sheet material past said marking instrument, one of said supporting means including a plurality of eccentric gear supporting portions having their centers angularly displaced from each other, means for continuously rotating said groups of gears, means for intermittently indexing said supporting means portions for successively moving associated master and workpiece gears into and out of checking engagement in timed relation with the rotation of said groups of gears, and means for driving said sheet material feeding means in timed relation with the rotation of said groups of gears.

References Cited in the file of this patent

UNITED STATES PATENTS

| | | |
|---|---|---|
| 1,483,419 | Eaton | Feb. 12, 1924 |
| 2,447,445 | Widen | Aug. 17, 1948 |

FOREIGN PATENTS

| | | |
|---|---|---|
| 887,651 | France | Nov. 19, 1943 |
| 918,788 | France | Feb. 18, 1947 |